No. 696,398. Patented Apr. 1, 1902.
A. F. BATCHELDER.
ARMATURE COIL.
(Application filed Nov. 3, 1900.)
(No Model.)

Witnesses.
Inventor.
Asa F. Batchelder
by Albert G. Davis
Atty.

UNITED STATES PATENT OFFICE.

ASA F. BATCHELDER, OF SCHENECTADY, NEW YORK, ASSIGNOR TO THE GENERAL ELECTRIC COMPANY, A CORPORATION OF NEW YORK.

ARMATURE-COIL.

SPECIFICATION forming part of Letters Patent No. 696,398, dated April 1, 1902.

Application filed November 3, 1900. Serial No. 35,333. (No model.)

*To all whom it may concern:*

Be it known that I, ASA F. BATCHELDER, a citizen of the United States, residing at Schenectady, county of Schenectady, State of New York, have invented certain new and useful Improvements in Armature-Coils, (Case No. 1,649,) of which the following is a specification.

My invention relates to coils for armatures for dynamo-electric generators and motors; and its object is to enable a compact and firm coil of the well-known Eickemeyer type to be wound of small wire. Heretofore it has been a difficult and troublesome job to wind a rectangular coil from wire as small as .025 inches in diameter owing to the fact that each turn of wire tends to slip out of place and overlap adjoining turns. This prevents the spaces between the armature-teeth from being filled solidly and evenly, and hence reduces the efficiency of the machine. In those small motors and generators which are designed to occupy as little space as possible this is a serious drawback. For the sake of securing a more compact and economical construction I have devised the improvement set forth, and particularly pointed out in the claims.

In brief, it consists in two or more wires laid side by side and secured together, so that when wound into a coil each turn of the coil is rectangular, and hence the turns lie flat on each other and have no tendency to slip off sidewise.

Figure 1:
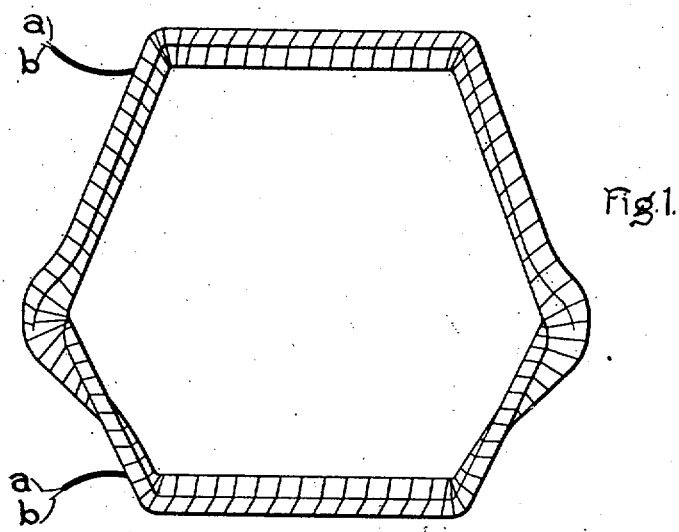
Figure 2:
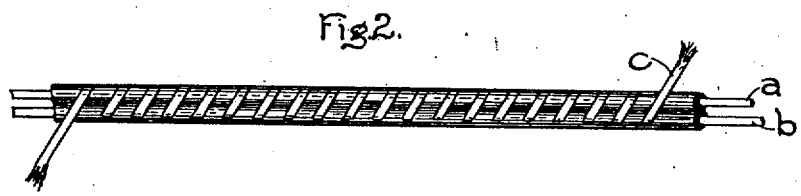
Figure 3:
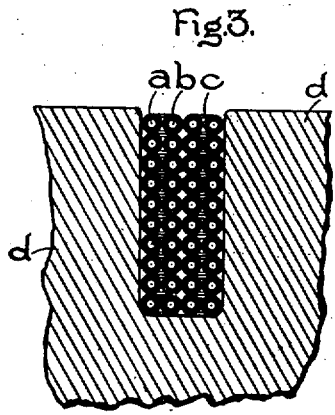

In the drawings, Figure 1 represents an Eickemeyer coil wound in accordance with my invention. Fig. 2 is a view, on an exaggerated scale, showing a piece of the "multiple" wire which I have devised. Fig. 3 is a cross-section showing how the coils fill the slot between the teeth on the core.

The insulated wires $a\,b$ are so small in practice that they will not readily remain superposed when laid up in a coil, but constantly tend to slip out sidewise and destroy the smooth and even shape of the coil. I therefore provide a rectangular conductor containing two or more wires insulated from each other and constituting what I term a "multiple wire." This may be constructed in any convenient manner. I prefer to lay the insulated wires $a\,b$ side by side and wrap around them a thin and preferably flat lashing $c$, of thread or other insulating material. The multiple wire, however made, is coiled up in the usual manner, each turn being rectangular and lying flat upon the one below, as shown in Fig. 3. It will be seen that two turns of a conductor containing two wires make a "four-turn" coil, which solidly fills the slot between the teeth $d$ of the armature.

While I have shown my invention as applied to two wires $a\,b$, yet I wish it understood that I may similarly construct a multiple conductor having any number of wires, preferably such a number as will constitute a rectangular structure each turn of which when it is wound into a coil will lie flat on the adjacent turn, and thus have no tendency to slip off.

Having thus described my invention, what I claim as new, and desire to secure by Letters Patent of the United States, is—

1. A coil for the armature of a dynamo-electric machine, composed of turns each containing a plurality of wires side by side.

2. A coil for the armature of a dynamo-electric machine, composed of multiple wires lying straight and parallel.

3. A coil for an armature, composed of superposed turns each composed of a plurality of insulated wires lashed together in rectangular form.

4. An electric-machine coil having a plurality of turns, each of which is composed of a plurality of insulated wires laid side by side and a lashing of insulating material binding them together.

5. A coil for an electric machine, which is composed of turns consisting of a plurality of wires held rigidly together side by side to form a flat turn, said turns being laid flatwise one upon another to fill the winding-space.

In witness whereof I have hereunto set my hand this 1st day of October, 1900.

ASA F. BATCHELDER.

Witnesses:
BENJAMIN B. HULL,
MARGARET E. WOOLLEY.